United States Patent
Shi et al.

(10) Patent No.: US 8,832,217 B2
(45) Date of Patent: Sep. 9, 2014

(54) SYSTEM AND METHOD FOR SUPPORTING DIFFERENT MESSAGE QUEUES IN A TRANSACTIONAL MIDDLEWARE MACHINE ENVIRONMENT

(75) Inventors: Peizhi Shi, Beijing (CN); Yongshun Jin, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 114 days.

(21) Appl. No.: 13/415,700

(22) Filed: Mar. 8, 2012

(65) Prior Publication Data

US 2013/0086196 A1 Apr. 4, 2013

Related U.S. Application Data

(60) Provisional application No. 61/541,055, filed on Sep. 29, 2011.

(51) Int. Cl.
| | |
|---|---|
| *G06F 15/167* | (2006.01) |
| *G06F 13/28* | (2006.01) |
| *G06F 13/00* | (2006.01) |
| *H04L 12/861* | (2013.01) |
| *G06F 9/54* | (2006.01) |
| *G06F 17/30* | (2006.01) |

(52) U.S. Cl.
CPC .......... *G06F 15/167* (2013.01); *H04L 49/9036* (2013.01); *G06F 9/546* (2013.01); *G06F 17/30227* (2013.01)
USPC ............. 709/212; 709/213; 709/216; 710/22; 710/26; 719/314

(58) Field of Classification Search
CPC ................ G06F 9/54–9/548; G06F 17/30227; G06F 15/167; H04L 49/9036
USPC ........ 709/203, 212–217; 710/22, 26; 719/314
See application file for complete search history.

(56) References Cited

U.S. PATENT DOCUMENTS

| | | | |
|---|---|---|---|
| 6,615,282 B1 | 9/2003 | Futral | |
| 6,766,358 B1 | 7/2004 | Chesson et al. | |
| 6,938,138 B2 * | 8/2005 | Beukema et al. | 711/163 |

(Continued)

FOREIGN PATENT DOCUMENTS

WO 99/57620 11/1999

OTHER PUBLICATIONS

Forin et al., High-Performance Distributed Objects Over System Area Networks, Proceedings of the 3rd Usenix Windows NT Symposium Usenix Assoc., Berkeley, CA, USA, 1999, pp. 21-30.

(Continued)

*Primary Examiner* — Gregory Todd
(74) *Attorney, Agent, or Firm* — Meyer IP Law Group

(57) ABSTRACT

A system and method can support different message queues in a transactional middleware machine environment. The transactional middleware machine environment includes an advertized table that comprises a first queue table and a second queue table, with the first queue table storing address information for a first message queue and the second queue table storing address information for a second message queue. The advertized table is further adaptive to be used by a first transactional client to locate a transactional service provided by a transactional server. The first transactional client operates to look up the first queue table for a key that indicates the address information of the transactional service that is stored in the second queue table.

20 Claims, 3 Drawing Sheets

(56) References Cited

U.S. PATENT DOCUMENTS

| | | | |
|---|---|---|---|
| 7,171,484 B1* | 1/2007 | Krause et al. | 709/232 |
| 7,281,030 B1* | 10/2007 | Davis | 709/212 |
| 7,574,536 B2* | 8/2009 | Johnsen et al. | 710/22 |
| 7,620,693 B1 | 11/2009 | Mott et al. | |
| 7,711,793 B1* | 5/2010 | Wilson | 709/217 |
| 7,849,228 B2* | 12/2010 | Boyd et al. | 710/3 |
| 7,944,920 B2* | 5/2011 | Pandya | 370/392 |
| 7,990,994 B1* | 8/2011 | Yeh et al. | 370/431 |
| 2003/0061417 A1* | 3/2003 | Craddock et al. | 710/54 |
| 2004/0015622 A1 | 1/2004 | Avery | |
| 2005/0050549 A1 | 3/2005 | Joseph et al. | |
| 2005/0220128 A1 | 10/2005 | Tucker et al. | |
| 2005/0254493 A1 | 11/2005 | Chang et al. | |
| 2007/0183418 A1 | 8/2007 | Riddoch et al. | |
| 2008/0126509 A1 | 5/2008 | Subramanian et al. | |
| 2008/0168471 A1 | 7/2008 | Benner et al. | |
| 2008/0294712 A1 | 11/2008 | Lu et al. | |
| 2010/0183024 A1 | 7/2010 | Gupta | |
| 2010/0238796 A1* | 9/2010 | Supalov | 370/225 |
| 2011/0078214 A1* | 3/2011 | Michaylov et al. | 707/809 |
| 2011/0142043 A1 | 6/2011 | Oved | |
| 2012/0216216 A1* | 8/2012 | Lopez Taboada et al. | 719/314 |
| 2012/0221621 A1 | 8/2012 | Sugawara | |

OTHER PUBLICATIONS

Ishizaki et al., CrispORB: High Performance CORBA for System Area Network, High Performance Distributed Computing, 1999, Proceedings of the Eighth International Symposium, Redondo Beach, CA, USA, Aug. 3-6, 1999, IEEE Comput. Soc., Los Alamitos, CA, USA, Aug. 3, 1999, pp. 11-18.

Grun, Introduction to InfiniBand for End Users [online], 2010, InfiniBand Trade Association, retrieved on Nov. 21, 2012, http://www.mellanox.com/pdf/whitepapers/Intro_to_IB_for_End_Users.pdf, 54 pages.

International Search Report and Written Opinion dated Feb. 7, 2013, International Application No. PCT/US2012/056945, 11 pages.

International Search Report and Written Opinion dated Nov. 20, 2012, International Application No. PCT/US2012/056950, 9 pages.

International Search Report and Written Opinion dated Dec. 11, 2012, International Application No. PCT/US2012/057121, 9 pages.

* cited by examiner

SYSTEM AND METHOD FOR SUPPORTING DIFFERENT MESSAGE QUEUES IN A TRANSACTIONAL MIDDLEWARE MACHINE ENVIRONMENT

CLAIM OF PRIORITY

This application claims the benefit of priority on U.S. Provisional Patent Application No. 61/541,055, entitled "SYSTEM AND METHOD FOR SUPPORTING DIFFERENT MESSAGE QUEUES IN A TRANSACTIONAL MIDDLEWARE MACHINE ENVIRONMENT" filed Sep. 29, 2011, which application is herein incorporated by reference.

CROSS-REFERENCED APPLICATIONS

The current application hereby incorporates by reference the material in the following patent applications:

U.S. patent application Ser. No. 13/415,670, entitled "SYSTEM AND METHOD FOR PREVENTING SINGLE-POINT BOTTLENECK IN A TRANSACTIONAL MIDDLEWARE MACHINE ENVIRONMENT," filed Mar. 8, 2012; and U.S. patent application Ser. No. 13/415,712, entitled "SYSTEM AND METHOD FOR SUPPORTING A COMPLEX MESSAGE HEADER IN A TRANSACTIONAL MIDDLEWARE MACHINE ENVIRONMENT," filed Mar. 8, 2012.

FIELD OF INVENTION

The present invention is generally related to computer systems and software such as middleware, and is particularly related to supporting a transactional middleware machine environment.

BACKGROUND

A transactional middleware system, or a transaction oriented middleware, includes enterprise application servers that can process various transactions within an organization. With the developments in new technologies such as high performance network and multiprocessor computers, there is a need to further improve the performance of the transactional middleware. These are the generally areas that embodiments of the invention are intended to address.

SUMMARY

Described herein is a system and method for supporting different message queues in a transactional middleware machine environment. The transactional middleware machine environment includes an advertized table that comprises a first queue table and a second queue table, with the first queue table storing address information for a first message queue and the second queue table storing address information for a second message queue. The advertized table is further adaptive to be used by a first transactional client to locate a transactional service provided by a transactional server. The first transactional client operates to look up the first queue table for a key that indicates the address information of the transactional service that is stored in the second queue table.

DETAILED DESCRIPTION

Figure 1:
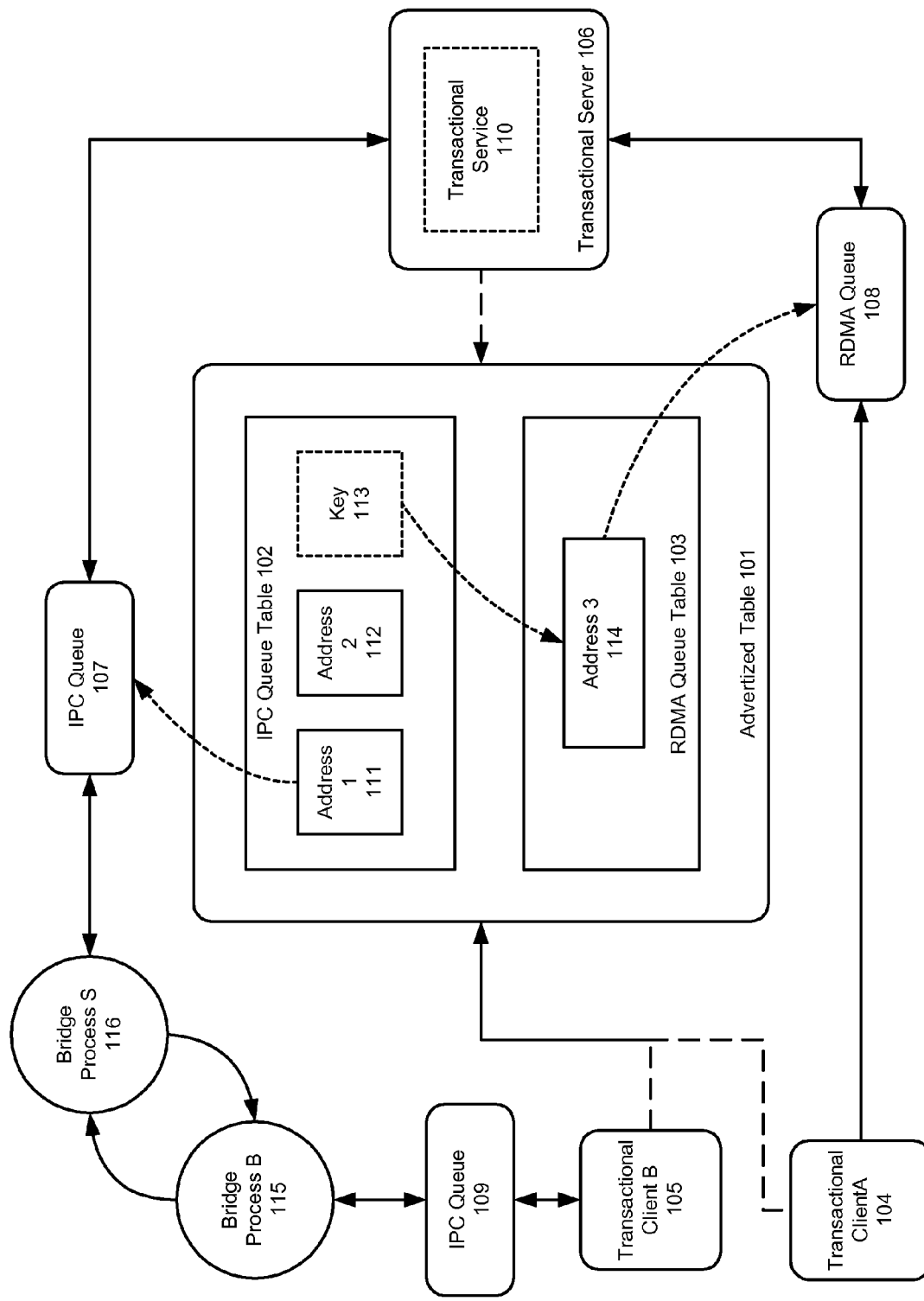
FIG. 1 shows an illustration of a transactional middleware machine environment that supports different message queues, in accordance with an embodiment of the invention.

Described herein is a system and method for supporting a transactional middleware system, such as Tuxedo, that can take advantage of fast machines with multiple processors, and a high performance network connection. An advertized service table can be used by a transactional server to locate a message queue that can send and receive messages via Remote Direct Memory Access (RDMA) protocol instead of via Inter-process Communication (IPC). The transactional middleware machine environment comprises a server that listens to a first message queue and a second message queue. The transactional middleware machine environment further comprises an advertized table that comprises a first queue table and a second queue table, wherein the first queue table stores address information for the first message queue and the second queue table stores address information for the second message queue. The advertized table is adaptive to be used by a client to locate a transactional service provided by the server. The first queue table contains a key that indicates the address information of the transactional service stored in the second queue table. The client can obtain the address information of the transactional service in the second message queue after first looking up the key in the first queue table.

In accordance with an embodiment of the invention, the system comprises a combination of high performance hardware, e.g. 64-bit processor technology, high performance large memory, and redundant InfiniBand and Ethernet networking, together with an application server or middleware environment, such as WebLogic Suite, to provide a complete Java EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, referred to herein as "Sun Oracle Exalogic" or "Exalogic", the system is an easy-to-deploy solution for hosting middleware or application server software, such as the Oracle Middleware SW suite, or Weblogic. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. Real Application Clusters and Exalogic Open storage. The system delivers improved performance with linear I/O scalability, is simple to use and manage, and delivers mission-critical availability and reliability.

In accordance with an embodiment of the invention, Tuxedo is a set of software modules that enables the construction, execution, and administration of high performance, distributed business applications and has been used as transactional middleware by a number of multi-tier application development tools. Tuxedo is a middleware platform that can be used to manage distributed transaction processing in distributed computing environments. It is a proven platform for unlocking enterprise legacy applications and extending them to a services oriented architecture, while delivering unlimited scalability and standards-based interoperability.

In accordance with an embodiment of the invention, a transactional middleware system, such as a Tuxedo system, can take advantage of fast machines with multiple processors, such as an Exalogic middleware machine, and a high performance network connection, such as an Infiniband (IB) network.

In accordance with an embodiment of the invention, a transactional middleware system can exchange messages between a local machine and a remote machine using Remote Direct Memory Access (RDMA) protocol to achieve short latency in a manner like a local message transfer, e.g. bypassing the bridge process and preventing single point bottleneck. Exchanging messages between a local machine and a remote machine using RDMA protocol is disclosed in U.S. application Ser. No. 12/415,670, filed Mar. 8, 2012, entitled "SYSTEM AND METHOD FOR PREVENTING SINGLE-POINT BOTTLENECK IN A TRANSACTIONAL MIDDLEWARE MACHINE ENVIRONMENT," which application is incorporated herein by reference in its entirety.

Supporting Different Message Queues

In accordance with an embodiment of the invention, different message queues, such as a RDMA message queue and a System V Inter-process Communication (IPC) message queue, can be supported in a transactional middleware machine environment, in order to prevent single-point bottleneck in transferring messages among machines.

FIG. 1 shows an illustration of a transactional middleware machine environment that supports different message queues, in accordance with an embodiment of the invention. As shown in FIG. 1, a transactional server 106 can publish one or more transactional services 110 in an advertized table 101, such as a bulletin board in Tuxedo. The advertized table is adaptive to be used by one or more clients 104 and 105 to locate a transactional service provided by the server.

In accordance with an embodiment of the invention, an advertized service table can include a RDMA queue table 103, in addition to an IPC queue table 102. The IPC queue stores address information for the IPC message queue 107 and can be used by a transactional client server 105 to locate the transactional service in the IPC queue. Additionally, the RDMA queue table stores address information for the RDMA message queue 108 and can be used by a transactional client server 104 to locate the transactional service in the RDMA queue.

In accordance with an embodiment of the invention, a transactional server can listen to an IPC queue and a RDMA queue at the same time. The RDMA queue table can be implemented so that the RDMA queue can be used concurrently and consistently with the System V IPC queue.

A transactional client can look up the queue tables in the advertized table in order to obtain the location information of the service that it needs. The client can first look up the IPC queue table 102 in the advertized table 101, e.g. the Tuxedo Bulletin Board (BB). If the obtained address information is a real IPC queue address, for example address 1 with a positive value 111, the client can use this IPC queue address to access the transactional server using an IPC queue 107 for the requested transactional services.

On the other hand, the transactional client can obtain a key 113 instead of a real IPC queue address. For example, the obtained address information can be a "faked" IPC queue address with a negative value. The client can look up the RDMA queue table in turn using the "faked" IPC queue address for a queue address 114 in the RDMA queue. Then, the client can access the transactional server for the requested transactional services using the RDMA queue.

Figure 2:
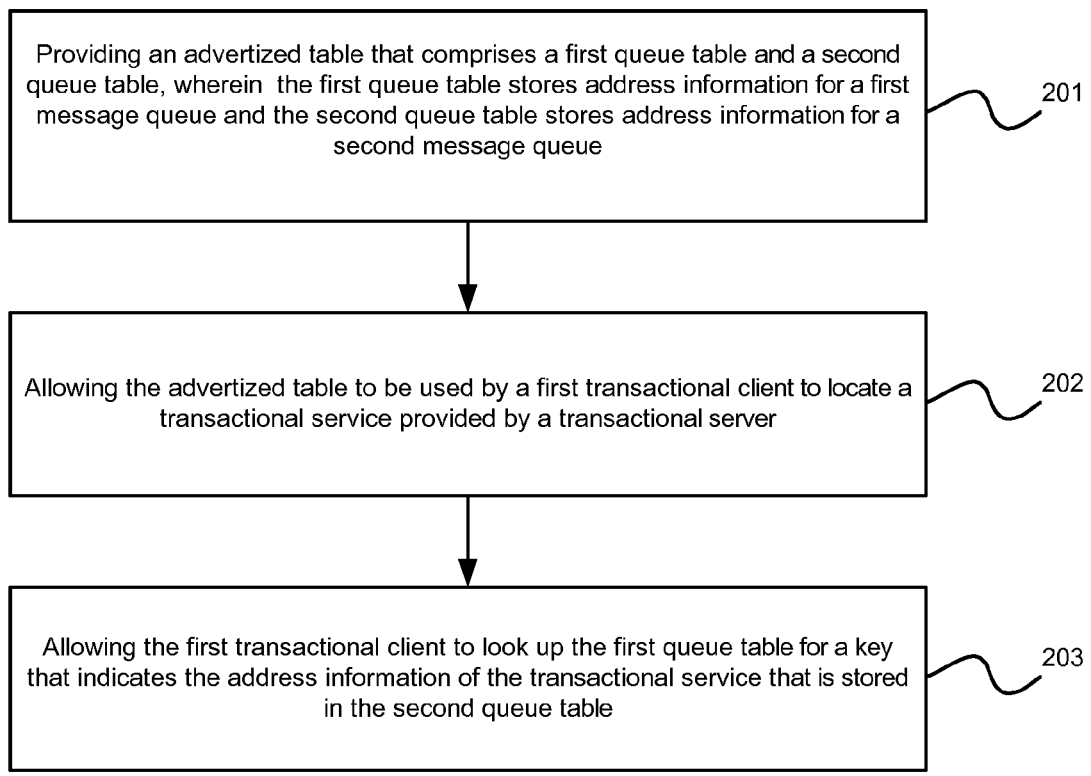
FIG. 2 illustrates an exemplary flow chart for supporting different message queues in a transactional middleware machine environment, in accordance with an embodiment of the invention.

FIG. 2 illustrates an exemplary flow chart for supporting different message queues in a transactional middleware machine environment, in accordance with an embodiment of the invention. As shown in FIG. 2, at step 201, an advertized table that comprises a first queue table and a second queue table, wherein the first queue table stores address information for a first message queue and the second queue table stores address information for a second message queue. Then, at step 202, the advertized table can be used by a first transactional client to locate a transactional service provided by a transactional server. Finally, at step 203, the first transactional client can look up the first queue table for a key that indicates the address information of the transactional service that is stored in the second queue table.

Referencing MSGQ Queue Information in Tuxedo Bulletin Board (BB)

In accordance with an embodiment of the invention, a Tuxedo application can take advantage of the RDMA protocol and use a MSGQ queue, which is a RDMA queue, in order to bypass the bridge processes and achieve a shorter latency in a manner similar to a local message transfer.

When the bypass bridge feature is activated, a Tuxedo client can use the MSGQ queue instead of System V IPC queue to send messages to a Tuxedo server. When the bypass bridge feature is not activated, a Tuxedo client can use the System V IPC queue instead of the MSGQ queue to send messages to Tuxedo server.

In accordance with an embodiment of the invention, different versions of Tuxedo can co-exist in a multi-process configuration. Processes in a machine installed with a version of Tuxedo without the bypass bridge feature can access the advertized table (or the bulletin board) in the version of Tuxedo with bypass bridge feature without problem, even though the internal structure in the Tuxedo Bulletin Board remains unchanged.

For example, in a version of Tuxedo without the bypass bridge feature, a bulletin board in a shared memory contains only System V IPC queue address, each of which is an eight-byte "long" variable. On the other hand, in a version of Tuxedo with bypass bridge feature, the RDMA MSGQ address can be an array of 128 bytes. Hence, if the Tuxedo bulletin board is changed, the offset of the bulletin board fields in different binaries can be wrong, and the binary compatibility is broken.

Figure 3:
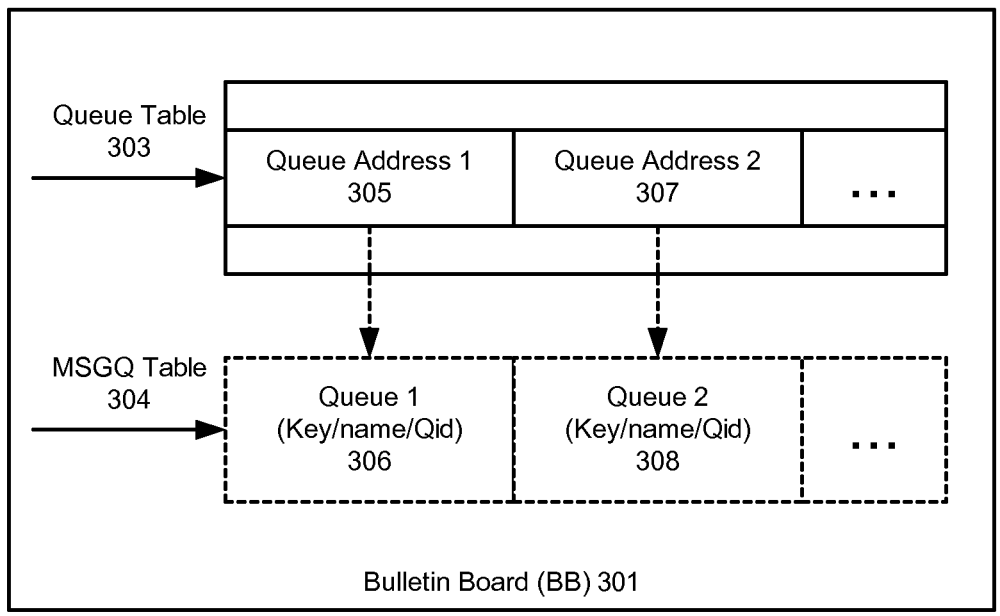
FIG. 3 shows an illustration of a transactional middleware machine environment with bypass bridge feature activated, in accordance with an embodiment of the invention.

FIG. 3 shows an illustration of a transactional middleware machine environment with bypass bridge feature activated, in accordance with an embodiment of the invention. As shown in FIG. 3, a MSGQ queue table 304 can be created in Tuxedo if the bypass bridge feature is activated. Each entry in this MSGQ queue table 306 or 308 contains information for a pair of MSGQ/System V IPC queues: {MSGQ queue name, MSGQ queue key, System V IPC queue address}.

Since the bypass bridge feature is activated, the IPC queue table 303 can contain a faked System V IPC queue address 305 or 307, which indicates that the location of the RDMA queue is stored in the RDMA queue table. For example, a faked System V IPC queue address can be a negative value. Then, the client can look into the RDMA queue table to obtain the queue information.

As shown in FIG. 3, the bulletin board data structure can be kept unchanged with the bypass bridge feature implemented. A separate section, containing the table of 128-bytes MSGQ address entries, can be created, appended to the end of bulletin board. The index of the entry can be stored in the System V IPC queue address field in the corresponding entry in the original bulletin board. Since there are at most 65536 RDMA MSGQ queues, the index may need 16 bits, and the other 16 bits can be used to distinguish whether this queue address is a System V IPC queue address, or an index for RDMA MSGQ queue address.

Figure 4:
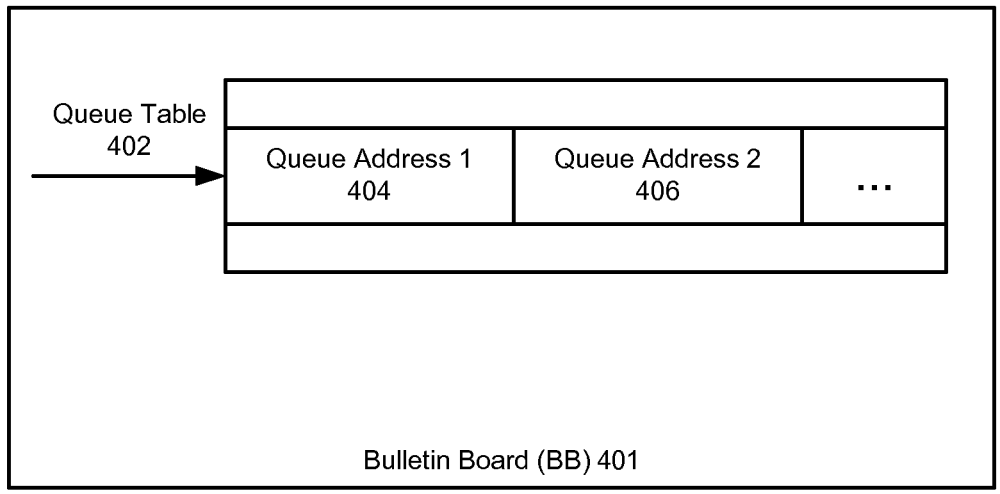
FIG. 4 shows an illustration of a transactional middleware machine environment with bypass bridge feature not activated, in accordance with an embodiment of the invention.

FIG. 4 shows an illustration of a transactional middleware machine environment with bypass bridge feature not activated, in accordance with an embodiment of the invention. As shown in FIG. 4, when the bypass bridge feature is not activated, no MSGQ section is created, and the internal structure of the bulletin board remains unchanged. Thus, the client can only see a positive System V IPC queue address 404 and 406 in the IPC queue table 402 when the bypass BRIDGE feature is not activated. The queue addresses in the bulletin board indicate the System V IPC queue addresses, so that the binaries can have the correct offsets of any field in the bulletin board.

In accordance with an embodiment of the invention, the data structure change can be isolated, so that the code change can be limited to a smaller scope since the data structure of the advertized service table does not need to be changed. Furthermore, the data structure change introduced by the bypass bridge feature in Tuxedo, which is a C based application, maintains interoperability among different versions of Tuxedo.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting an Inter-Process Communication (IPC) queue and a Remote Direct Memory Access (RDMA) queue in a transactional middleware machine environment, comprising:
  a computer memory accessible by a plurality of transactional clients operating on one or more microprocessor and a plurality of transactional servers operating on one or more microprocessor;
  an advertized table, in said computer memory, that comprises an IPC queue table and an RDMA queue table,
    wherein the IPC queue table stores IPC queue addresses for an IPC message queue for IPC messages,
    wherein the RDMA queue table stores RDMA queue addresses for an RDMA message queue for RDMA messages,
    wherein said IPC queue addresses are in a different format than said RDMA queue addresses, and
    wherein the IPC queue table also stores keys which indicate RDMA queue addresses in the RDMA queue table;
  wherein, in response to an IPC request from a first transactional client to access a transactional service of a transactional server, the IPC queue table provides one of said IPC queue addresses or one of said keys,
    wherein if an IPC queue address is provided by the IPC queue table, the transactional client can use the IPC queue address to access the transactional server, and
    wherein if a key is provided by the IPC queue table, the client can use the key to identify an RDMA queue address in the RDMA queue table, and then use the identified RDMA queue address to access the transactional server.

2. The system of claim 1, wherein said transactional server listens to both the IPC message queue and the RDMA message queue.

3. The system of claim 1, wherein the first transactional client operates to send a message to the transactional server via the RDMA message queue, based on the address information of the transactional service stored in the RDMA queue table.

4. The system of claim 1, wherein the advertized table is configured to be used by a second transactional client to locate a transactional service provided by a transactional server.

5. The system of claim 4, wherein the second transactional client operates to send a message to the transactional server via a local bridge process using the IPC message queue, based on the address information of the transactional service stored in the IPC queue table.

6. The system of claim 1, wherein said keys are IPC queue addresses having negative values.

7. The system of claim 6, wherein the key is a faked IPC queue address.

8. The system of claim 1, wherein the RDMA queue table is appended to an end of the IPC queue table.

9. The system of claim 1, wherein the transactional server publish address information of the transactional service in the advertized table.

10. The system of claim 1, wherein each entry in the RDMA queue table contains information for both the IPC message queue and the RDMA message queue.

11. A method for supporting an Inter-Process Communication (IPC) queue and a Remote Direct Memory Access (RDMA) queue in a transactional middleware machine environment, comprising:
providing an advertized table that comprises an IPC queue table and an RDMA queue table,
wherein the IPC queue table stores IPC queue addresses for an IPC message queue for IPC messages,
wherein the RDMA queue table stores RDMA addresses for an RDMA message queue for RDMA messages, and
wherein said IPC queue addresses are in a different format than said RDMA queue addresses, and
wherein the IPC queue table also stores keys which indicate RDMA queue addresses in the RDMA queue table;
providing from the IPC queue table, in response to an IPC request from a first transactional client to access a transactional service of a transactional server, one of said IPC queue addresses or one of said keys,
wherein if an IPC queue address is provided by the IPC queue table, the transactional client can use the IPC queue address to access the transactional server, and
wherein if a key is provided by the IPC queue table, the client can use the key to identify an RDMA queue address in the RDMA queue table, and then use the identified RDMA queue address to access the transactional server.

12. The method of claim 11, further comprising allowing said transactional server to listen to both the IPC message queue and the RDMA message queue.

13. The method of claim 11, further comprising allowing the first transactional client to send a message to the transactional server via the RDMA message queue, based on the RDMA address of the transactional service stored in the RDMA queue table.

14. The method of claim 11, further comprising allowing the advertized table to be used by a second transactional client to locate a transactional service provided by a transactional server.

15. The method of claim 14, further comprising allowing the second transactional client to send a message to the transactional server via a local bridge process using the IPC message queue, based on an address of the transactional service stored in the IPC queue table.

16. The method of claim 11, wherein said keys are IPC queue addresses having negative values.

17. The method of claim 16, wherein the key is a faked IPC queue address.

18. The method of claim 11, further comprising creating said advertized table by appending the RDMA queue table to an end of a preexisting advertized table comprising said IPC queue table.

19. The method of claim 11, further comprising allowing the transactional server to publish address information of the transactional service in the advertized table.

20. A non-transitory computer-readable storage medium storing a set of instructions for supporting different message queues in a transactional middleware machine environment, said instructions, when executed by one or more processors, causing the one or more processors to perform steps comprising:
providing an advertized table that comprises an IPC queue table and an RDMA queue table,
wherein the IPC queue table stores IPC queue addresses for an IPC message queue for IPC messages,
wherein the RDMA queue table stores RDMA addresses for an RDMA message queue for RDMA messages, and
wherein said IPC queue addresses are in a different format than said RDMA queue addresses, and
wherein the IPC queue table also stores keys which indicate RDMA queue addresses in the RDMA queue table;
providing from the IPC queue table, in response to an IPC request from a first transactional client to access a transactional service of a transactional server, one of said IPC queue addresses or one of said keys,
wherein if an IPC queue address is provided by the IPC queue table, the transactional client can use the IPC queue address to access the transactional server, and
wherein if a key is provided by the IPC queue table, the client can use the key to identify an RDMA queue address in the RDMA queue table, and then use the identified RDMA queue address to access the transactional server.

* * * * *